(12) United States Patent
Naegelkraemer et al.

(10) Patent No.: US 11,757,389 B2
(45) Date of Patent: Sep. 12, 2023

(54) METHOD FOR NOISE REDUCTION OF A THREE-PHASE-DRIVEN ELECTRICAL MACHINE

(71) Applicant: Dr. Ing. h.c. F. Porsche Aktiengesellschaft, Stuttgart (DE)

(72) Inventors: Jan Naegelkraemer, Stuttgart (DE); Maximilian Barkow, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 17/586,820

(22) Filed: Jan. 28, 2022

(65) Prior Publication Data

US 2022/0247334 A1 Aug. 4, 2022

(30) Foreign Application Priority Data

Feb. 1, 2021 (DE) .................... 10 2021 102 266.5

(51) Int. Cl.
| | |
|---|---|
| *H02P 21/05* | (2006.01) |
| *H02P 21/00* | (2016.01) |
| *H02P 27/12* | (2006.01) |
| *B60L 53/20* | (2019.01) |

(52) U.S. Cl.
CPC .............. *H02P 21/05* (2013.01); *B60L 53/20* (2019.02); *H02P 21/0017* (2013.01); *H02P 27/12* (2013.01)

(58) Field of Classification Search
CPC ...... H02P 21/05; H02P 21/0017; H02P 27/12; H02P 6/34; H02P 7/06; H02P 21/50; H02P 21/0003; H02P 25/022; H02P 27/06; B60L 53/20; B60L 2240/421; B60L 2260/44; B60L 2270/142; B60L 15/20; Y02T 10/64; Y02T 10/72; H02K 5/24; H02K 1/18; G01R 31/34
See application file for complete search history.

(56) References Cited

U.S. PATENT DOCUMENTS

| | | | |
|---|---|---|---|
| 5,394,322 A | * | 2/1995 | Hansen ................ G05B 13/045 700/32 |
| 2002/0175649 A1 | * | 11/2002 | Reutlinger .......... H02P 21/0021 318/609 |
| 2004/0066161 A1 | | 4/2004 | Marx et al. |
| 2005/0125114 A1 | | 6/2005 | Atmur |

(Continued)

FOREIGN PATENT DOCUMENTS

| | | |
|---|---|---|
| DE | 102013211151 A1 | 12/2014 |
| DE | 102018202967 A1 | 8/2019 |

*Primary Examiner* — Muhammad S Islam
*Assistant Examiner* — Bradley R Brown
(74) *Attorney, Agent, or Firm* — LEYDIG, VOIT & MAYER, LTD.

(57) ABSTRACT

A method for noise reduction of a three-phase-driven electrical machine includes recording an angular state of a rotor of the electrical machine, calculating a reference frequency on the basis of the recorded angular state, forming a sine and cosine value of the calculated reference frequency, and filtering the sine and cosine value. The method may also include recording a sound-related feedback variable, forming a weighting vector, forming a superposition signal, and applying the superposition signal to a manipulated variable of the electrical machine.

13 Claims, 4 Drawing Sheets

(56) References Cited

U.S. PATENT DOCUMENTS

| | | | |
|---|---|---|---|
| 2016/0111986 A1* | 4/2016 | Vollmer | H02P 21/14 |
| | | | 318/400.23 |
| 2018/0172485 A1* | 6/2018 | Lechner | G01D 5/20 |
| 2018/0188070 A1* | 7/2018 | Lechner | G01D 1/16 |
| 2018/0236882 A1* | 8/2018 | Wang | B60L 50/51 |
| 2020/0014318 A1 | 1/2020 | Wang et al. | |
| 2020/0118536 A1* | 4/2020 | Valeri | G10K 11/1785 |
| 2022/0014402 A1 | 1/2022 | Nelles et al. | |

\* cited by examiner

METHOD FOR NOISE REDUCTION OF A THREE-PHASE-DRIVEN ELECTRICAL MACHINE

CROSS REFERENCE TO RELATED APPLICATIONS

This application claims benefit to German Patent Application No. DE 10 2021 102 266.5, filed on Feb. 1, 2021, which is hereby incorporated by reference herein.

FIELD

The invention relates to a method for noise reduction of a three-phase-driven electrical machine, to a computer-assisted apparatus with such a method, and to an electrified motor vehicle.

BACKGROUND

With the increasing use of high-power electrical machines, the need has arisen to reduce noises of the electrical machine which are undesired and are sometimes perceived as unpleasant, particularly in the field of motor vehicles. Conventionally used sound insulation is mostly unsuitable for this, and there are therefore various known attempts to reduce the nuisance to persons, for example vehicle passengers of such a motor vehicle. Known, for example, is the so-called noise cancelling method or ANR [Active Noise Reduction], which is known for example from sound protection headsets, in particular for unimpaired enjoyment of music or to allow unimpaired conversation in a small propeller airplane. For this purpose, there are approaches of equipping a passenger compartment of a vehicle with a corresponding noise cancelling system. However, environmental nuisance cannot be prevented in this way. It has also been found that effective noise reduction with this system is very expensive. Dealing with secondary sound excitation due to vibrational excitation of component parts in the likewise audible and perturbing range is furthermore problematic. On the basis of this, the object of the present invention is to at least partially overcome the disadvantages known from the prior art.

SUMMARY

In an embodiment, the present disclosure provides a method for noise reduction of a three-phase-driven electrical machine. The method includes, from the electrical machine, recording an angular state of a rotor, calculating a reference frequency on the basis of the recorded angular state, forming a sine value and a cosine value of the calculated reference frequency, filtering the sine value and cosine value that have been formed, by means of a secondary section, a control section for the electrical machine being modeled by the secondary section by means of a transfer function, and thereby forming a reference signal vector, at the electrical machine, recording a sound-related feedback variable, forming a weighting vector on the basis of the recorded feedback variable and the reference signal vector that has been formed, forming a superposition signal from a sum of the sine value and cosine value weighted with the weighting vector, and applying the superposition signal to a manipulated variable of the electrical machine.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
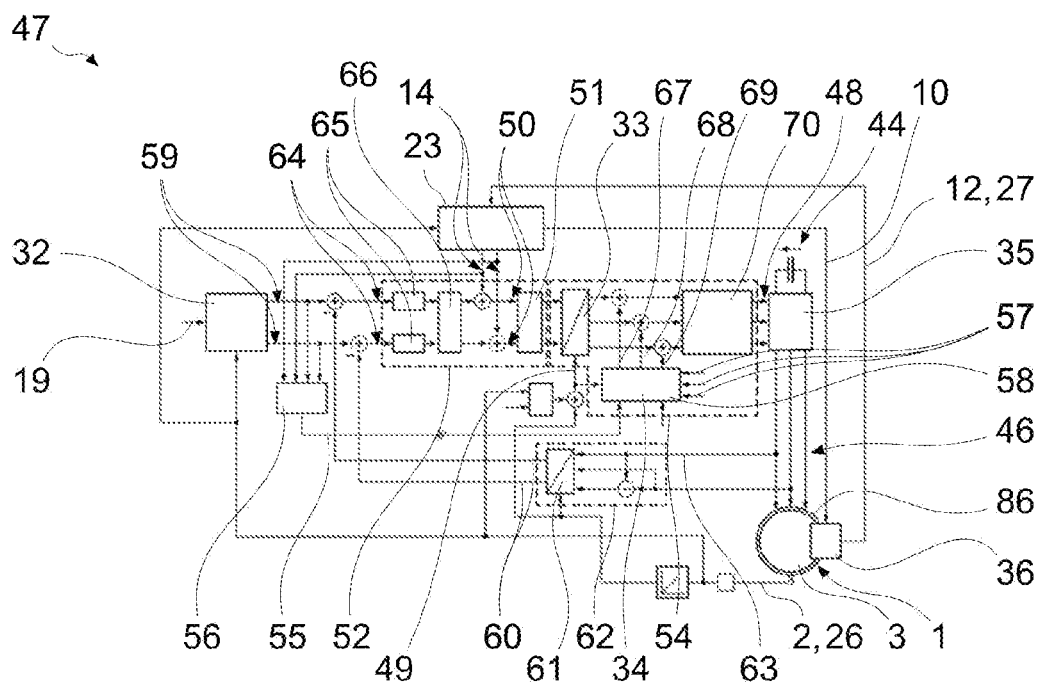
FIG. 1 represents a schematic control loop for controlling a three-phase-driven electrical machine.

Embodiments of the present invention at least partially overcome disadvantages known from the prior art.

The invention relates to a method for noise reduction of a three-phase-driven electrical machine, having the following steps:

a. from the electrical machine, recording the angular state of its rotor;
b. calculating a reference frequency on the basis of the recorded angular state;
c. forming the sine value and the cosine value of the calculated reference frequency;
d. filtering the sine value and cosine value that have been formed, by means of a secondary section, the control section for the electrical machine being modeled by the secondary section by means of a transfer function, and thereby forming a reference signal vector;
e. on the electrical machine, recording a sound-related feedback variable;
f. forming a weighting vector on the basis of the recorded feedback variable and the reference signal vector that has been formed;
g. forming a superposition signal from the sum of the sine value and cosine value weighted with the weighting vector; and
h. applying the superposition signal to the manipulated variable of the electrical machine.

Unless explicitly indicated to the contrary, ordinal numbers used in the description above and below serve only for clear distinction and do not reflect any order or rank of the components denoted. An ordinal number greater than one does not imply that such a further component must necessarily be present.

A method for noise reduction of a three-phase-driven electrical machine is proposed here, with which the cause of such perturbing noises can be reduced directly in the excitation of the stator and/or rotor. First, the angular state of the rotor, i.e. its relative position or angular velocity with respect to the stator and the exciting coils or magnets, is recorded. The corresponding reference frequency $f_{ref}$ is subsequently calculated. The sine value and the cosine value of the product of the reference value $f_{ref}$ and a full revolution ($2\pi$) are then formed. The sine value and the cosine value may be filtered in a secondary section, while being treated as a two-dimensional vector, the control section being modeled by the secondary section onto the electrical machine to be regulated. To this end, for example, an approximated function in the scope of a digital filter or a more complex representation of the control section may be used. A sound-related feedback variable e, which is directly related to the perturbing noises, is furthermore recorded at the electrical machine. On the basis of the recorded feedback variable e, the sine value and the cosine value are weighted, for example by means of a least mean squares algorithm [LMS algorithm]. A superposition signal y is subsequently generated from the sum of the weighted sine value and cosine value, i.e. a sin weighting value $w_{sin}$ and a cos weighting value $w_{cos}$ are formed. To this end the weighting vector formed, or its respective vector value, i.e. sin weighting value $w_{sin}$ in relation to the sine value and cos weighting value $w_{cos}$ in relation to the cosine value, is multiplied by the respectively corresponding (sine or cosine) value. The sum of this weighted sine product and cosine product is formed. This corresponds for example to the amplitude $A_{ANR}$ of a noise cancelling signal multiplied by the cosine value of the sum of the reference frequency $f_{ref}$ and the phase $\varphi_{ANR}$ of a noise cancelling signal. This superposition signal is then applied to the manipulated variable(s) (for example the voltage values $v_d$ and $v_q$ according to the Park transform for the stator) of the electrical machine. The occurrence of noise perceived as perturbing is therefore significantly reduced directly in the electrical machine, a reduction by 16 dB [sixteen decibels] or a reduction by 85% [eighty-five percent] being for example achievable with such a method. The above explanations are below presented in the form of formulas. The counter-signal may be mathematically described with the aid of Equation (1):

$$y = w_{sin} \sin(2\pi f_{ref}) + w_{cos} \cos(2\pi f_{ref}) = A_{ANR} \cdot \cos(2\pi f_{ref} + \varphi_{ANR}) \quad (1)$$

The amplitude and the phase may be determined therefrom with the Equations (2) and (3):

$$A_{ANR} = \sqrt{w_{sin}^2 + w_{cos}^2} \quad (2)$$

$$\varphi_{ANR} = -\arctan\left(\frac{w_{cos}}{w_{sin}}\right) \quad (3)$$

In order to ensure the stability of the adaptive filter in operation, it is implemented for example as an FIR filter [finite impulse response filter]. In one embodiment, the filter coefficient b of the adaptive filter is optimized with the aid of an iterative optimization method in the form of an LMS algorithm so that the square of the superposition signal is minimal. The signal e to be minimized is mathematically described by Equation (4). In this case, the filter coefficient is adapted with the increment u in the direction of the steepest descent. The increment in this case influences on the one hand the convergence rate and on the other hand the stability. The optimization of the filter weighting values $w_{sin}$ and $w_{cos}$ with the aid of the gradient from Equation (5) may be carried out iteratively.

$$b(n+1) = b(n) - u \cdot \nabla e^2(n) \quad (4)$$

$$\nabla e^2(n) = grad(e^2) = 2 \cdot x_{f,ref} \cdot e(n) = 2 \cdot \begin{pmatrix} \sin(n) \\ \cos(n) \end{pmatrix} \cdot e(n) \quad (5)$$

In one advantageous embodiment of the method, it is furthermore proposed that in step b. the reference frequency is calculated by multiplying a predetermined characteristic ordinal number and the recorded angular state.

In this embodiment, it is proposed that the angular state of the rotor of the electrical machine is multiplied by a predetermined characteristic ordinal number in order to calculate the reference frequency $f_{ref}$. This ordinal number is for example dependent on the number of stator magnets or stator coils, or on the number of phases of the three-phase-driven electrical machine. For example, such an ordinal number is 6 [six], 12 [twelve] or 18 [eighteen] for a three-phase machine.

In one advantageous embodiment of the method, it is furthermore proposed that the method comprises a multiplicity of parallel transfer sections, step b. to step g. being carried out in each transfer section respectively with a different characteristic ordinal number in step b., a single superposition signal per transfer section being formed in step g., and in step h. the multiplicity of superposition signals being applied by superposition to the manipulated variable for the stator of the electrical machine.

It is proposed here that the method comprises a multiplicity of parallel transfer sections, each transfer section being implemented with a different ordinal number and in other regards being implemented identically to the method described above. Subsequently, the respective individual superposition signals $y_{1a}$, $y_{1b}$, $y_{1c}$ calculated in parallel are added together and applied to the manipulated variable(s) (for example $v_d$, $v_q$) for the stator of the electrical machine.

In one advantageous embodiment of the method, it is furthermore proposed that the angular state is the frequency signal in the electrical or mechanical reference system of the electrical machine.

It is proposed here that the angular state is the frequency signal (for example f el), either in the electrical reference system or in the mechanical reference system of the machine. The angular state is therefore directly dependent on the rotational speed together with the interrogated torque, and at the same time is a signal which can be utilized in the method without further preliminary processing.

In one advantageous embodiment of the method, it is furthermore proposed that the feedback variable is based on at least one of the following values:

the surface acceleration of a component driven in rotation by the electrical machine, such as its stator; and a sound signal, which may be recorded in an interior of a passenger compartment of a motor vehicle driven by the electrical machine.

It is proposed here that the feedback variable e in one embodiment is the surface acceleration of the rotationally driven component, such as its stator, or of the rotor or a component connected to the rotor. The surface acceleration is directly related to the mechanical excitation of the rotating system, and therefore to the generation of disturbing noises. In the event of an increased torque applied suddenly, for example, an increased slip occurs relative to the magnetic excitation, and an oscillating excitation of the stator or the stator magnets or stator coils, or the respective core of the stator, therefore results. The same applies for the rotor, although recording is more elaborate for the latter because of the rotation. This in turn interacts with the exciting magnetic field and may sometimes cause (audible or exciting) mechanical oscillations on the stator side. Because of the very short regulating section of the method proposed here, it is possible to react rapidly to such sudden events, the maximum attenuation being (stably) achieved for example even after 0.5 s [one half of a second], a significant reduction, for example 50%, already being reached in less than half this time. In addition or as an alternative, it is proposed that a sound signal, which for example is recorded by means of a microphone in the interior of a passenger compartment, is used as the feedback variable e. One advantage of this embodiment is that in this case the sound propagation may also be taken into account and processing of putatively perturbing noises may be omitted because of existing attenuation effects. In an embodiment, a stronger weighting furthermore takes place as a function of the recorded sound signal while the surface acceleration is likewise recorded, i.e. in simple terms depending on how high the sound level of the sound signal is, or how perturbingly the respective frequency is perceived as a function of the sensitivity of the human ear.

In one advantageous embodiment of the method, it is furthermore proposed that the transfer function of the secondary section is empirically determined for the electrical machine on the basis of the transfer behavior of a frequency sweep applied to the manipulated variable for its stator, the transfer function being a function approximated to the empirically determined transfer behavior.

Here, it is now proposed that the transfer function of the secondary section is determined empirically by applying a corresponding frequency sweep. The amplitude and phases determined therefrom may be recorded by means of the frequency (of the frequency sweep). In one advantageous embodiment, an approximated, i.e. deviation-minimized, function is determined as the transfer function and used in the secondary section.

In one advantageous embodiment of the method, it is furthermore proposed that a physical control section is modeled by the secondary section, the secondary section comprising at least one of the following components:
  a machine regulator;
  a phase converter;
  a nonlinear compensation part;
  a pulse width modulation;
  an inverter;
  the dynamic electric field of the electrical machine; and
  the measurement value acquisition.

In one embodiment, the secondary section corresponds to the physical control section, albeit to a simplified extent. In an embodiment, a subdivision of the secondary section into individual components is not necessary for simulation of the complex, strongly nonlinear transfer behavior of the control section. Rather, the definition given in this case merely denotes the portion of the control section which is replicated by the secondary section, and therefore in this advantageous embodiment the secondary section is located or its input variable and output variable are linked with the control section.

According to a further aspect, a computer-assisted apparatus is proposed, comprising at least a processor and a memory for carrying out a method according to one embodiment in accordance with the description above.

A computer-assisted apparatus comprises one or more processors, for example an all-purpose processor (CPU) or microprocessor, RISC processor, GPU and/or DSP. The computer-assisted apparatus has, for example, additional elements such as memory interfaces. Optionally or in addition, the terms relate to such an apparatus which is capable of executing a provided or installed program, such as with a standardized programming language, for example C++, JavaScript or Python, and/or controlling and/or accessing data storage devices and/or other devices such as input interfaces and output interfaces. The term computer-assisted apparatus also refers to a multiplicity of processors or a multiplicity of (sub)$_c$—mputers, which are connected and/or otherwise communicatively linked to one another, and which possibly use one or more other resources, for example a memory, together.

A (data) memory is for example a hard disk (HDD, SSD, HHD) or a (nonvolatile) solid-state memory, for example a ROM memory or flash memory (flash EEPROM). The memory often comprises a multiplicity of individual physical units or is distributed over a multiplicity of separate devices, so that access thereto takes place by means of data communication, for example a package data service. The latter is a decentral solution, memories and processors of a multiplicity of separate computer units being used instead of a (single integral) central on-board computer or in addition to a central on-board computer.

According to a further aspect, a computer program comprising computer program code is proposed, the computer program code being executable on at least one computer in such a way that the at least one computer is made to carry out the method according to one embodiment in accordance with the description above, at least one of the computers being:
  integrated into an on-board computer of a motor vehicle; and/or
  adapted for communication with an on-board computer of a motor vehicle.

According to a further aspect, a computer product on which the computer program code is stored is proposed, the computer program code being executable on at least one computer in such a way that the at least one computer is made to carry out the method according to one embodiment in accordance with the description above, at least one of the computers being:
  integrated into an on-board computer of a motor vehicle; and/or
  adapted for communication with an on-board computer of a motor vehicle.

A computer program product comprising computer program code is for example a medium, for example RAM, ROM, an SD card, a memory card, a flash memory card or a disk. In some embodiments, a computer program product is stored on a server and is downloadable. As soon as the computer program is made readable by means of a read-out unit, for example a drive, and/or installation, the computer program code contained and the method contained therein may be executed by a computer, or in communication with a multiplicity of computer-assisted apparatuses, for example in accordance with the description above.

In one embodiment, a learning algorithm in which a multiplicity of data can be taken into account and used to improve a regulation result is integrated. Such a learning algorithm (deep learning algorithm) is already known from the fields of speech recognition, or speech processing, and face recognition, which are characterized in that they are based on data quantities which humans cannot handle sufficiently and/or on rules which are only insufficiently known or not known at all. In a similar way to a finite element algorithm, such a deep learning algorithm is fundamentally trivial but because of the complexity (in this case above all the amount of base data) the tasks are insoluble, or can only be solved with an acceptable time expenditure, by a human. Known deep learning algorithms, or usable program libraries, are for example TensorFlow®, Keras and Microsoft® Cognitive Toolkit. Here, for example, acceleration events or terrain data (in a navigation system) in a motor vehicle and noise production resulting therefrom in the electrical machine may be anticipated by the learning algorithm.

According to a further aspect, an electrified motor vehicle having at least the following components, is proposed:
- at least one propulsion wheel;
- a three-phase-driven electrical machine which is connected to the at least one propulsion wheel so as to transmit torque for propulsion of the motor vehicle;
- at least one electrical energy store for the electrical machine;
- an inverter for phase-controlled supply of the electrical machine with an electrical voltage from at least one voltage source; and
- at least one on-board computer with a processor and a memory, wherein the at least one on-board computer is adapted to carry out a method according to one embodiment in accordance with the description above for noise reduction of the electrical machine.

The motor vehicle is for example an electrified automobile, for example a Porsche Taycan. The propulsion wheels are adapted for propulsion of the vehicle and can be supplied with a corresponding torque by means of the at least one electrical machine. In order to meter the propulsion, a speed sender unit (traditionally referred to as a gas pedal) is provided in the driver's compartment, for example. The speed sender unit specifies the control value for the method for controlling the three-phase-driven electrical machine, by means of which value the acceleration (and in some embodiments also deceleration) of the motor vehicle can be intuitively adjusted. In some embodiments, further input values, with which for example vehicle values and/or traffic data are taken into account, are provided.

Figure 2:
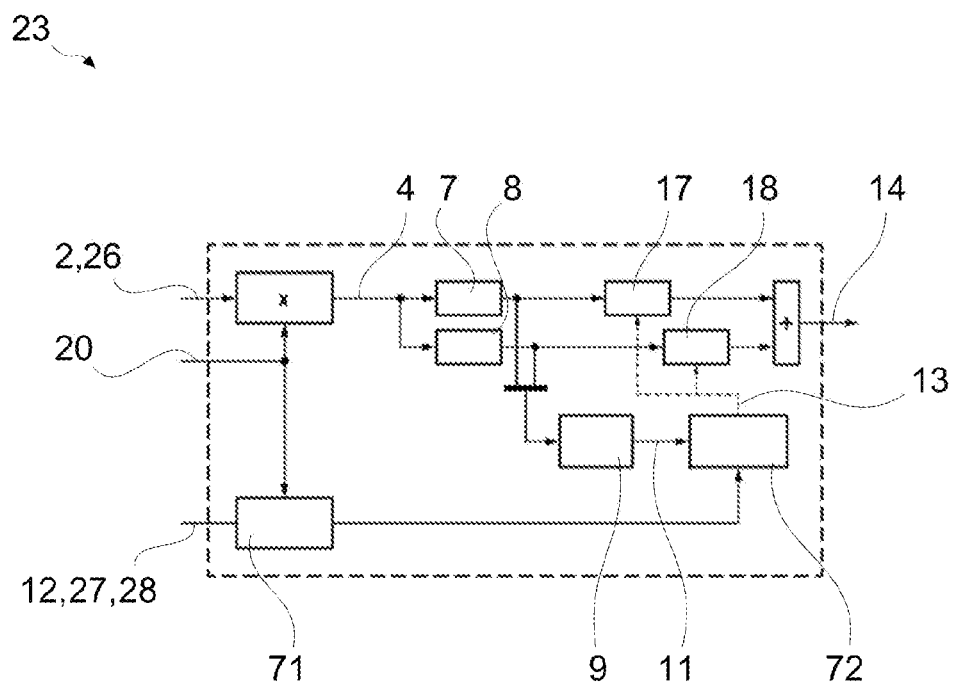
FIG. 2 represents a schematic control loop of a transfer section.
Figure 3:
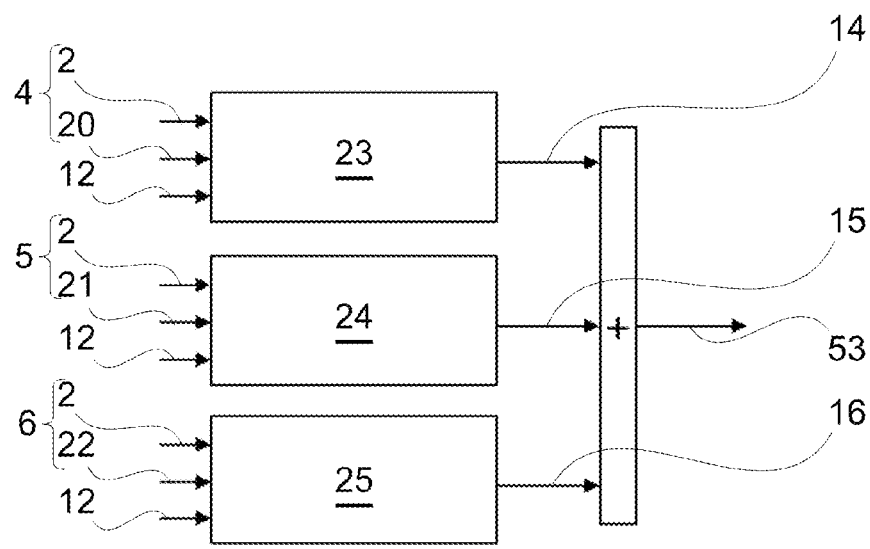
FIG. 3 represents a parallel use of three parallel transfer sections.

FIG. 1 to FIG. 3 show schematic control loops, or details thereof, of a method for controlling a three-phase-driven electrical machine 1, or for the noise reduction thereof. In this case, the method steps are respectively represented as a block or by means of a mathematical symbol. The mode of representation corresponds to a schematic which is conventional in control technology, the individual blocks not needing to be embodied as separate hardware components, i.e. not needing to be elements of a hardware-implemented control loop. Rather, the regulation represented may be carried out on a computer-assisted device which is adapted to carry out all the method steps with one or more processors 37 and one or more memories 38. The computer-assisted device has corresponding interfaces for indirect and/or direct communication with measurement sensors and control value sensors.

The electrical machine 1 may be a synchronous machine. For the electricity supply of the electrical machine 1, a voltage source 44 which provides a voltage, such as a DC voltage, is provided. The DC voltage is converted by means of an inverter 35 into a three-phase current, which is fed into the coils of the stator 86 of the electrical machine 1 in order to cause a rotation of a rotor 3 of the electrical machine 1. Each phase of the drive circuit 46 of the electrical machine 1 is connected to at least one coil. The current in the different phases is in each case angularly offset. In the case of a three-phase drive circuit 46, the angular offset between two coils is in each case 120°.

The schematic control loop shown in FIG. 1 shows merely one possible place of use of the noise reduction method described here, and this method will not be described here in detail. The inverter 35 is controlled by means of a control device 47. The control device 47 delivers a control data set 48 to the inverter 35. The control data set 48 according to the exemplary embodiment represented contains respective voltage signals for each of the three phases of the drive circuit 46 of the electrical machine 1. The voltage signals are correspondingly applied to the gate of the inverter 35 in order to influence the flow of current in the respective phases.

In this embodiment, the control device 47 carries out an angle estimation. Such an angle estimation makes it possible to determine the electrical angle 49 in the phases of the drive circuit 46 without sensors. In a synchronous machine, the rotor angle of the electrical machine 1 is deduced therefrom.

The sum of the superposition signal 14 and (processed in the machine regulator 32) the manipulated variable 19 and the angular state 2 is described by the combination data set 50, which (after processing in the amplitude correction block 51) is an output variable of the addition block 52. In some embodiments, a plurality of superposition signals 14, 15, 16 are determined as a function of different ordinal numbers of one or more transfer sections 23, 24, 25 and superimposed as a sum superposition signal 53 (cf. FIG. 3) on the manipulated variable 19. As two input variables, the combination data set 50 enters a control calculation block 54, which prepares the data for use as control data in the inverter 35 and sends them as control data, for example as voltage values, to the inverter 35.

In addition to the method steps already described, a precontrol angle 55 is calculated in a precontrol angle calculation block 56. The precontrol angle 55 enters, as an input variable, a nonlinearity compensation part 34 by means of which systematic errors are compensated for or fluctuations are smoothed. As further input variables, correction voltages 57, which comprise the DC voltage that is provided by the voltage source 44 and possibly further voltage values (for example for calculating line losses), a time correction value 58 and an estimated future angle 49 enter the nonlinearity compensation part 34 as input variables.

In the exemplary embodiment represented, the machine regulator 32 calculates a reference current vector 59 having two reference current values according to the rotor-fixed coordinate system used (d/q transform or Park transform). A measurement current vector 60, which contains two current values according to the rotor-fixed coordinate system used, is subtracted from the reference current vector 59, the current values being determined from the data measured in the drive circuit 46. The measurement current vector 60 corresponds in the exemplary embodiment represented to the recording data set of the current data. The data of the recording data set are output by a coordinate converter 61. The coordinate converter 61, which converts the phases u,v,w into the reference current values d,q of a reference current vector 59, is contained together with the subtraction block represented next to it in the recording block 62. In the coordinate converter 61, current signals which correspond to the system response 63 of the drive circuit 46 are thus converted from a phase-specific coordinate system into a rotor-fixed coordinate system.

The current vector 64 determined, which is obtained from the difference of the reference current vector 59 and the measurement current vector 60, is converted by means of a proportional-integral regulator into a reference voltage vector having the voltage reference values. Other regulation steps, for example decoupling regulation, are furthermore carried out. This is represented here by the proportional-integral (PI) regulation part 65 and the amplitude correction block 51.

The superposition signals 14 are added to (superimposed on) the processed current vector 64 (here immediately after a decoupling regulation block 66 and immediately before the amplitude correction block 51). From the combined voltage vector, obtained therefrom, of the combination data set 50, a phase-specific voltage value is respectively calculated per phase u,v,w. A compensation voltage value 67, 68, 69, determined by the nonlinearity compensation part 34, is added to each of the phase-specific voltage values that are obtained as output variables from the phase converter 33, and those values determined in this way are converted by means of pulse width modulation in a pulse width modulator 70 (PWM converter) into pulse width modulation values of the control data, so that they can be processed by the inverter 35.

The proportional-integral regulation part 65 [PI regulator], a decoupling regulation block 66 and the addition symbols, which are represented by plus signs, are contained in the aforementioned addition block 52. The phase converter 33, the addition symbols which follow the phase converter 33 in each phase, the nonlinearity compensation part 34 and the pulse width modulator 70 (PWM converter) are contained in the control calculation block 54.

The feedback variable 12 is in this case recorded (for example once) by means of measurement value acquisition 36 directly at the stator 86 of the electrical machine 1, specifically as a surface acceleration 27, and sent to the (first) transfer section 23.

FIG. 2 represents a schematic control loop of a (first) transfer section 23, such as may be used for example in the control loop according to FIG. 1 for noise reduction of the electrical machine 1 there. On the basis of a recorded angular state 2 (here for example of the electrical frequency signal 26) of the rotor 3, the (first) reference frequency 4 $f_{ref}$ is calculated by means of multiplication by a selected (here first) ordinal number 20. The sine value 7 (in the upper path) and the cosine value 8 (in the lower path) of the product of the (first) reference frequency 4 $f_{ref}$ and a full revolution ($2\pi$) are then formed. The sine value 7 and the cosine value 8 are filtered in a secondary section 9, in some embodiments while being treated as a two-dimensional vector, and a reference signal vector 11 $x_{f,ref}$ is generated, the control section 10 being modeled (for example, in the form of a transfer function) by the secondary section 9 onto the electrical machine 1 to be regulated. On the basis of a sound-related feedback variable 12 e, recorded at the electrical machine 1 (for example the surface acceleration 27 of the electrical machine 1, a component of the equipment and/or the sound signal 28 of an (interior 29) microphone), after preparation in a preparation filter 71 (for example analog/digital conversion, filtering of the order in question by an adaptive peak filter and/or anti-aliasing filter), the sine value 7 and the cosine value 8 are weighted by means of the associated values of a weighting vector 13. The weighting vector 13 is formed from the reference signal vector 11 $x_{f,ref}$, for example by means of a least mean squares algorithm 72. A superposition signal y is subsequently generated from the sum of the weighted sine value 7 and the weighted cosine value 8, i.e. a sine weighting value 17 $w_{sin}$ and a cosine weighting value 18 $w_{cos}$. To this end the weighting vector formed, or its respective vector value, i.e. a sin weighting value 17 $w_{sin}$ in relation to the sine value 7 and a cos weighting value 18 $w_{cos}$ in relation to the cosine value, is multiplied by the respectively corresponding (sine or cosine) value. The sum y is formed from this weighted sine product and cosine product. This corresponds for example to the amplitude $A_{ANR}$ of a noise cancelling signal multiplied by the cosine value 8 of the sum of the reference frequency $f_{ref}$ and the phase $\varphi_{ANR}$ of a noise cancelling signal. This superposition 14 is subsequently applied, for example added, to the manipulated variable(s) 19 for the stator 86 of the electrical machine 1.

FIG. 3 represents a parallel use of three parallel transfer sections 23, 24, 25, which are respectively configured for example as shown in FIG. 2. The respective first reference frequency 4, 5, 6 is determined from the angular state 2 and the respective ordinal number 20, 21, 22. The angular state 2 and the feedback variable 12 are for example the same for each of the transfer sections 23, 24, 25. The filters may be adapted to the respective ordinal number 20, 21, 22. Each transfer section 23, 24, 25 respectively delivers a superposition signal 14, 15, 16 as an output value, which are superimposed with (here, added to) one another and a sum superposition signal 53 is thus formed. This sum superposition signal 53 is subsequently applied, for example added, to the manipulated variable(s) 19 for the stator 86 of the electrical machine 1.

Figure 4:
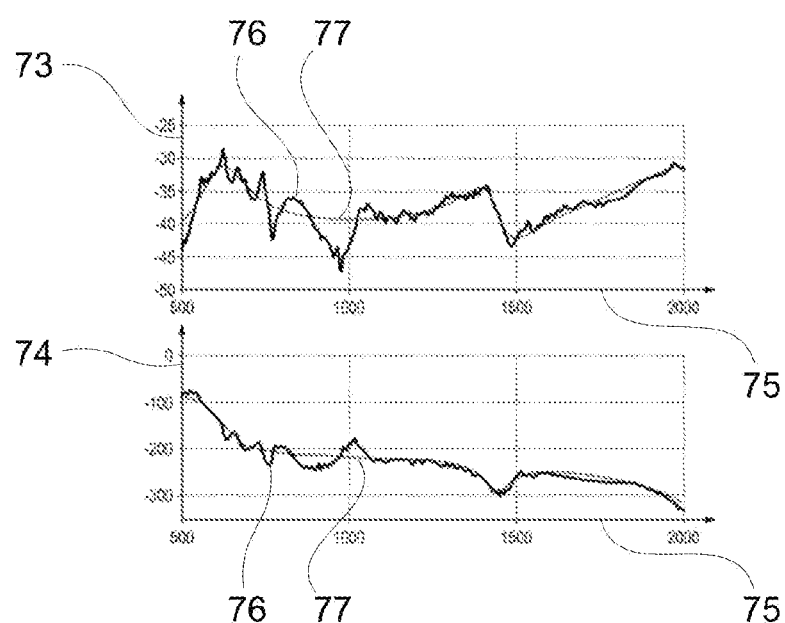
FIG. 4 represents a transfer function of the secondary section in a Bode plot.

FIG. 4 shows by way of example a possible transfer function of the secondary section 9 in a Bode plot. The first ordinate 73 (upper diagram portion) is the amplitude axis, indicated here in dB. The second ordinate 74 (lower diagram portion) is the phase axis given in degrees [of 360°]. The abscissa 75 shows the frequency axis in hertz. The curve 76 of the transfer function (thick line) has for example been empirically determined by applying a frequency sweep to a specific electrical machine 1. The curve 77 of the transfer function (thin line) is approximated to the curve 76 of the transfer behavior.

Figure 5:
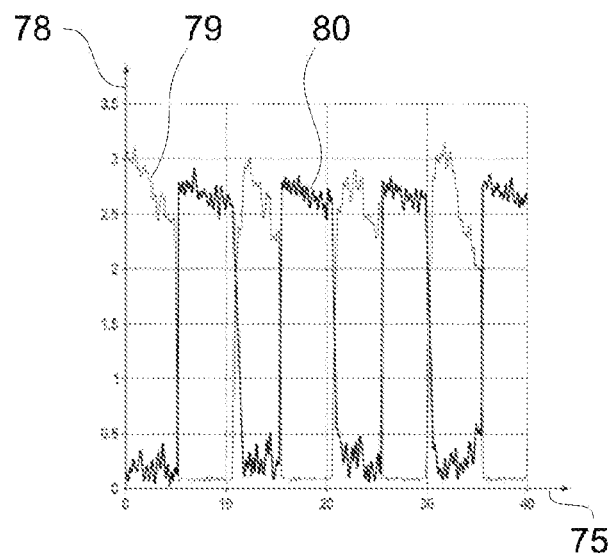
FIG. 5 represents a diagram of a measurement series relating to the reaction of a system.

FIG. 5 represents a diagram of a measurement series for the reaction of a system with a specific electrical machine 1, for example with a control device 47 as shown in FIG. 1. On the (third) ordinate 78, on the one hand the current strength, here in amperes, and on the other hand the surface acceleration 27, here in m/s$^2$ [meters per second squared], are plotted. The abscissa 75 shows the time, here in seconds. Here, the regulation for noise reduction was alternately turned on and off, the regulation for noise reduction being on (for example at the time zero) where the curve 79 of the q current lies between about 2.5 A [two and a half amperes] and 3 A, and being off (for example at the time 6 seconds) where the curve 79 of the q current (thin line) is close to zero. The curve 80 of the surface acceleration 27 (thick line) shows a very rapid and efficient adjustment behavior with high stability and reproducible noise reduction. The surface acceleration 27 is attenuated from about 3 m/s$^2$ to at most 0.6 m/s$^2$ (better on average). A reduction of 16 dB or 85% is thus achieved. The (full) stabilization is already reached after less than 0.5 s [one half of a second].

Figure 6:
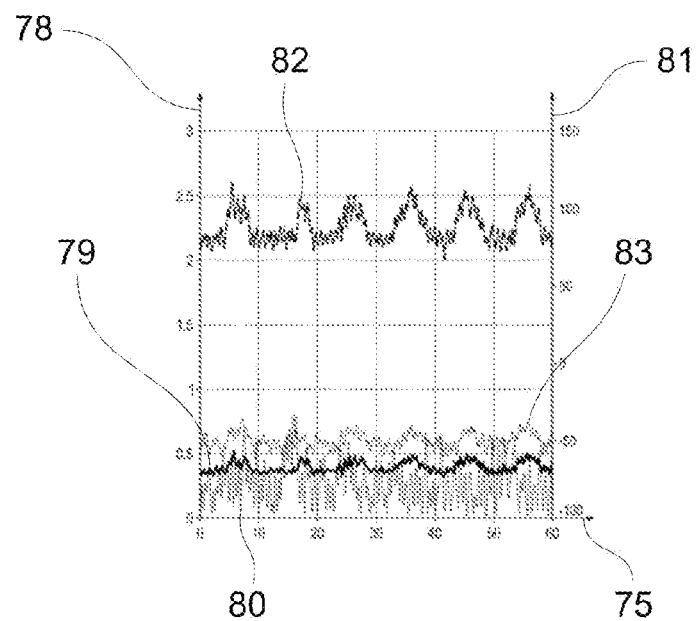
FIG. 6 represents a diagram of a measurement series relating to the oscillation of a system.

FIG. 6 represents a diagram of a measurement series for the oscillation of a system with a specific electrical machine 1, for example with a control device 47 as shown in FIG. 1. On the (third) ordinate 78 (on the left), as in FIG. 5, on the one hand the current strength, here in amperes, and on the other hand the surface acceleration 27, here in m/s$^2$, are plotted. On the (fourth) ordinate 81 (on the right), on the one hand the amplitude (in volts) and on the other hand the phase in degrees of the active noise reduction are plotted. The abscissa 75 shows the time (in seconds). Here, a perturbation variable is applied as a test state oscillation. It can be seen that (as shown in FIG. 5 in the on state) the profile of the curve 79 of the q current (lower thick line) remains stable below a maximum of 0.6 A, and the curve 80 of the surface acceleration 27 (lowest, thin and dashed line) remains stable below at most 0.8 m/s$^2$. The values of the (for example first) transfer section 23 (cf. FIG. 2) are likewise stable, namely the curve 82 of the ANR amplitude (upper of the lower lines, with thin line) around 50 V [fifty volts] and the curve 83 of the ANR phase (uppermost line, thick and dot/dashed) around 90° [ninety degrees]. The ANR amplitude is increased by about 14% [fourteen percent] in order to compensate for the perturbation variable, and the transfer section 23 reacts dynamically and reliably within the 60 seconds considered here.

Figure 7:
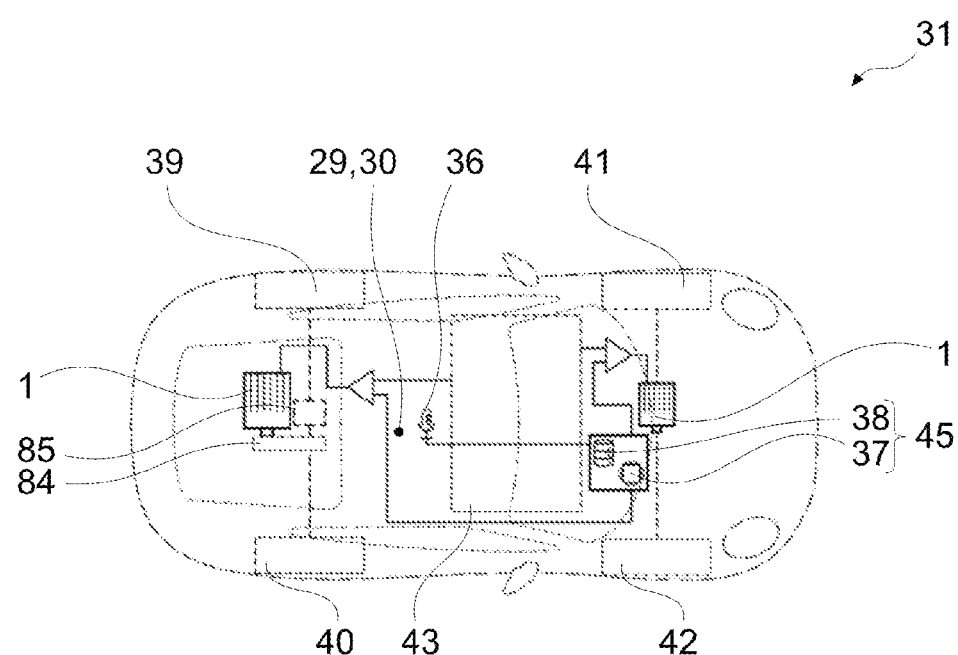
FIG. 7 represents a motor vehicle with an electrical machine.

FIG. 7 shows a motor vehicle 31 in a schematic plan view. An (optionally electrical) machine 1, which for propulsion of the motor vehicle 31 is connected via a transmission 84 and a differential 85 to a left rear propulsion wheel 39 and to a right rear propulsion wheel 40, is (optionally) arranged in the region of the tail. A left front propulsion wheel 41 and a right front propulsion wheel 42, which (optionally in addition or as an alternative) are also connected for propulsion to a second (optionally electrical) machine 1 so as to transmit torque, are arranged, in some embodiments steerably, in the region of the front of the motor vehicle 31. Here, an electrical energy store 43, is contained (optionally between the rear propulsion wheels 39, 40 and the front propulsion wheels 41, 42) may be configured as a traction battery, as a voltage source 44 for at least one of the electrical machines 1. Furthermore represented is an on-board computer 45 comprising a (data) memory 38 and a (data) processor 37, which controls the supply of the (here two) electrical machines 1, in some embodiments according to a method according to an embodiment described above. Here, for an alternative or additional embodiment of the method, a microphone, which is communicatively connected to the on-board computer 45, is provided in the interior 29 of the passenger compartment 30 for the measurement value acquisition 36.

A method for noise reduction of a three-phase-driven electrical machine, with which the cause of such perturbing noises can be reduced directly in the excitation of the rotor or stator, is proposed here.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCES 1 electrical machine
2 angular state
3 rotor
4 first reference frequency
5 second reference frequency
6 third reference frequency
7 sine value
8 cosine value
9 secondary section
10 control section
11 reference signal vector
12 feedback variable
13 weighting vector
14 first superposition signal
15 second superposition signal
16 third superposition signal
17 sine weighting value
18 cos weighting value
19 manipulated variable
20 first ordinal number
21 second ordinal number
22 third ordinal number
23 first transfer section
24 second transfer section
25 third transfer section
26 frequency signal
27 surface acceleration
28 sound signal
29 interior
30 passenger compartment
31 electrified motor vehicle
32 machine regulator
33 phase converter
34 nonlinearity compensation part
35 inverter
36 measurement value acquisition
37 processor
38 memory
39 left rear propulsion wheel
40 right rear propulsion wheel
41 left front propulsion wheel
42 right front propulsion wheel
43 energy store
44 voltage source
45 on-board computer
46 drive circuit
47 control device
48 control data set
49 estimated future angle
50 combination data set
51 amplitude correction block
52 addition block
53 sum superposition signal
54 control calculation block
55 precontrol angle
56 precontrol angle calculation block
57 correction voltage
58 time correction value
59 reference current collector
60 measurement current vector
61 coordinate converter
62 recording block
63 system response (current signals)
64 current vector
65 proportional integral (PI) regulation part 66 decoupling regulation block
67 u compensation voltage value
68 v compensation voltage value
69 w compensation voltage value
70 pulse width modulator (PWM converter)
71 preparation filter
72 least mean squares algorithm
73 first ordinate
74 second ordinate
75 abscissa
76 curve of the transfer behavior
77 curve of the transfer function
78 third ordinate
79 curve of the q current
80 curve of the surface acceleration
81 fourth ordinate
82 curve of the ANR amplitude
83 curve of the ANR phase
84 transmission
85 differential
86 stator

The invention claimed is:

1. A method for noise reduction of a three-phase-driven electrical machine, the method comprising the following steps:
 a from the electrical machine, recording an angular state of a rotor;
 b calculating a reference frequency on the basis of the recorded angular state;
 c forming a sine value and a cosine value of the calculated reference frequency;
 d secondary section, a control section for the electrical machine being modeled by the secondary section by means of a transfer function, and thereby forming a reference signal vector;
 e filtering the sine value and cosine value that have been formed, by means of a at the electrical machine, recording a sound-related feedback variable;
 f forming a weighting vector on the basis of the recorded feedback variable and the reference signal vector that has been formed;
 g forming a superposition signal from a sum of the sine value and cosine value weighted with the weighting vector; and
 h applying the superposition signal to a manipulated variable of the electrical machine.

2. The method as claimed in claim 1, wherein:
 in step b the reference frequency is obtained by multiplying a predetermined characteristic ordinal number and the recorded angular state.

3. The method as claimed in claim 2, wherein:
 the method comprises a plurality of parallel transfer sections and a plurality of superposition signals,
 step b to step g are carried out in each transfer section respectively with a different characteristic ordinal number in step b,
 a single superposition signal per transfer section is formed in step g, and
 in step h the plurality of superposition signals is applied by superposition to the manipulated variable for a stator of the electrical machine.

4. The method as claimed in claim 1, wherein
 the angular state is a frequency signal in the electrical or mechanical reference system of the electrical machine.

5. The method as claimed in claim 1, wherein
 the feedback variable is based on at least one of the following values:
  a surface acceleration of a component driven in rotation by the electrical machine; and
  a sound signal.

6. The method as claimed in claim 1, wherein
 the transfer function of the secondary section is empirically determined for the electrical machine on the basis of a transfer behavior of a frequency sweep applied to the manipulated variable for a stator.

7. The method as claimed in claim 1, wherein
 a physical control section is modeled by the secondary section, the secondary section comprising at least one of the following components:
  a machine regulator;
  a phase converter;
  a nonlinear compensation part;
  a pulse width modulation;
  an inverter;
  a dynamic electric field of the electrical machine; and
  a measurement value acquisition.

8. A computer-assisted apparatus having at least a processor and a memory for carrying out a method as claimed in claim 1.

9. An electrified motor vehicle having at least the following components:
 at least one propulsion wheel;
 a three-phase-driven electrical machine which is connected to the at least one propulsion wheel so as to transmit torque for propulsion of the motor vehicle;
 at least one electrical energy store for the electrical machine;
 an inverter for phase-controlled supply of the electrical machine with an electrical voltage from at least one voltage source; and
 at least one on-board computer with a processor and a memory,
 wherein the at least one on-board computer is adapted to carry out a method as claimed in claim 1 for noise reduction of the electrical machine.

10. The method as claimed in claim 1, wherein the manipulated variable is a voltage value.

11. The method as claimed in claim 1, wherein the manipulated variable is a voltage value according to a Park transform for a stator of the electrical machine.

12. The method as claimed in claim 1, further comprising controlling the electrical machine using the superposition signal applied to the manipulated variable of step h.

13. The method as claimed in claim 1, wherein filtering the sine value and cosine value in step d comprises implementing a finite impulse response filter.

* * * * *